June 20, 1967  R. H. TOWN  3,326,142
CHOCOLATE MOLDING MACHINE
Filed Feb. 10, 1965  3 Sheets-Sheet 1
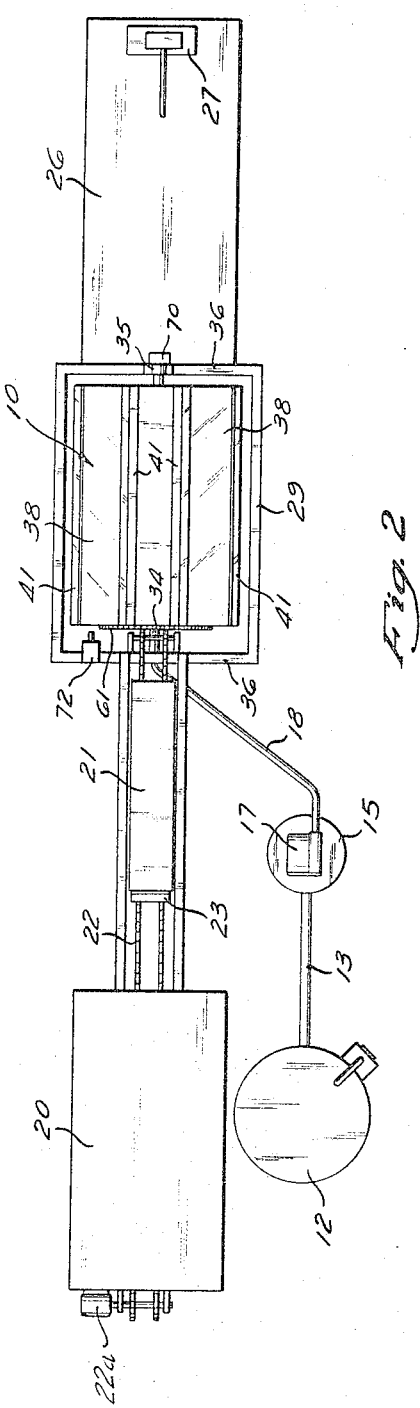
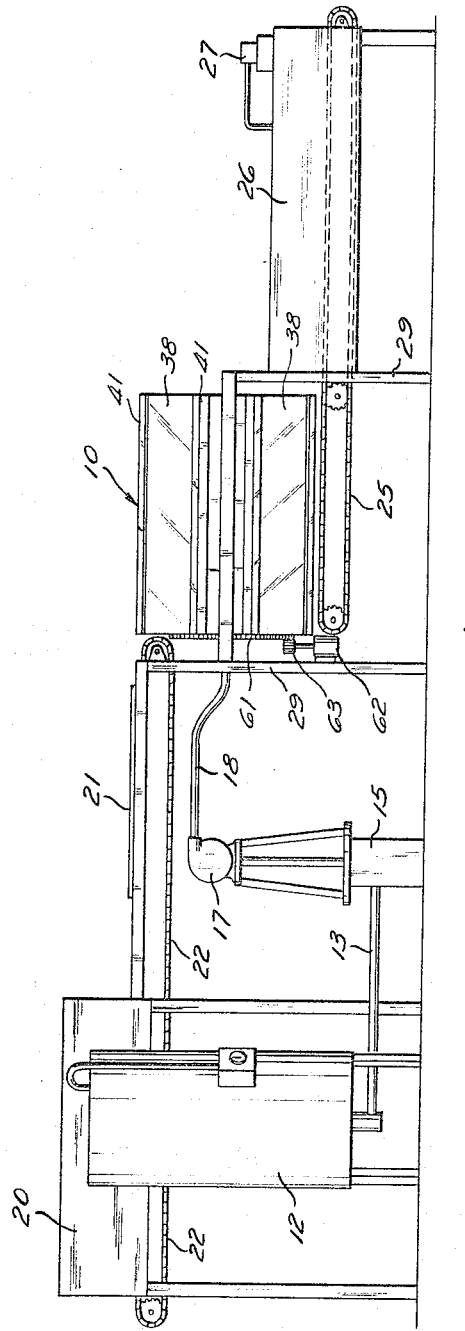
INVENTOR.
ROY H. TOWN
BY McNENNY, FARRINGTON, PEARNE, & GORDON
ATTORNEYS

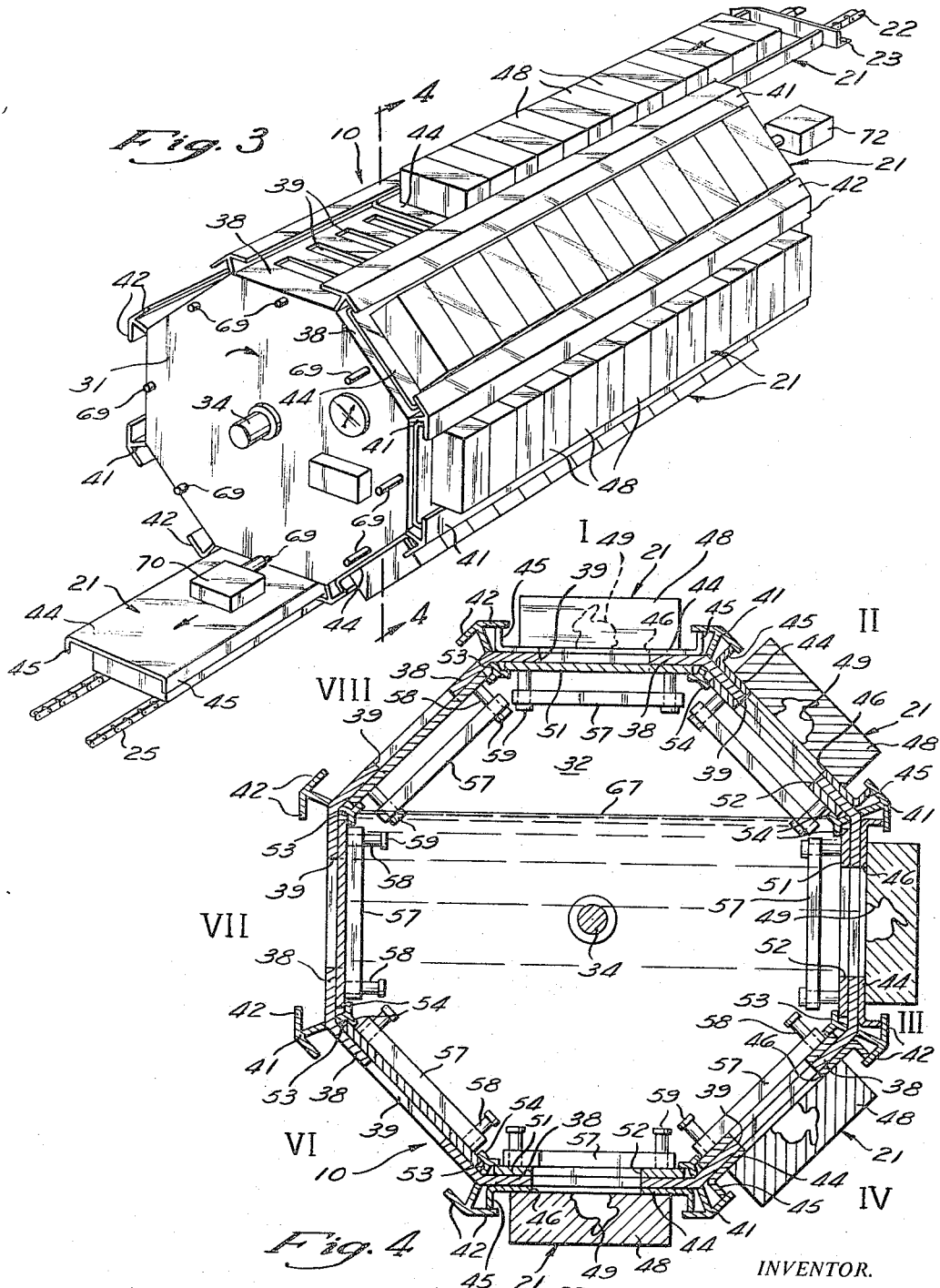

June 20, 1967  R. H. TOWN  3,326,142
CHOCOLATE MOLDING MACHINE
Filed Feb. 10, 1965  3 Sheets-Sheet 3

INVENTOR.
ROY H. TOWN
BY
McNENNY, FARRINGTON, PEARNE & GORDON
ATTORNEYS

United States Patent Office 3,326,142
Patented June 20, 1967

3,326,142
CHOCOLATE MOLDING MACHINE
Roy H. Town, 19437 Riverview Ave.,
Rocky River, Ohio 44116
Filed Feb. 10, 1965, Ser. No. 431,655
8 Claims. (Cl. 107—8)

This invention relates generally to the manufacture of chocolate confections and more particularly to apparatus for utilizing liquid chocolate in the making of molded and chocolate coated confections. The apparatus in the preferred embodiment is particularly adapted to fill simultaneously a plurality of molds for making molded chocolate articles, either solid or hollow, and with slight modifications it is adapted to enrobing and depositing type operations.

Heretofore the manufacture of molded chocolate articles has been accomplished by preparing one or more molds which, either individually or as a group, are filled with chocolate by hand from a suitable nozzle type dispensing apparatus or the like, after which the molds are either allowed to fully harden in the case of a solid article, or allowed to cool sufficiently to form a shell of solidified chocolate, after which the interior chocolate, still being liquid, is poured out of the mold and after a further cooling period the hollow articles are then removed. The molds involved in the making of such articles are relatively expensive and the runs of articles may be quite short necessitating a high expense because a large number of molds are required and very often the speed of manufacture is determined by the number of molds as well as by the speed of the mold filling and handling equipment.

The handling of liquid chocolate in molding and other operations is greatly complicated by the fact that chocolate is a very delicate material and must be handled at precisely controlled temperatures and in a controlled manner if satisfactory operations such as molding, enrobing, and depositing are to be carried out with success to produce a finished article having the necessary surface appearance without bloom or other defects. It is necessary that the chocolate being handled be maintained at a temperature range within several degrees Fahrenheit of the desired temperature and the chocolate must be continually mixed to maintain a uniform temperature throughout the operation as well as tempered to provide the necessary seeding for controlled crystallization, both to insure that proper crystallization and hardening will take place at the desired time and to prevent premature occurrence of such hardening or crystallization which would interfere with satisfactory operation of the chocolate handling apparatus.

Another problem is that the general product line of a manufacturer of chocolate confections requires that he produce a wide variety of finished candies and the handling of chocolate and the manufacture of such articles has previously required a wide variety of equipment, since separate equipment has been required for such diversified operations as molding solid or hollow articles, enrobing, or covering centers with a chocolate coating and depositing or producing small articles of solid chocolate.

It is therefore a principal object of this invention to provide a novel apparatus for handling liquid chocolate which is particularly adapted to fill a large number of molds simultaneously and at a high rate allowing a short cycle time for the molds to achieve a high productivity for molds as well as the ability to handle a large volume of chocolate in the case of large articles.

It is a further object of this invention to provide a novel chocolate handling apparatus as set forth in the preceding object which is capable of handling a large volume of chocolate for high production operation without sacrifice of the quality of the chocolate.

It is a further object of this invention to provide a novel chocolate handling apparatus as set forth in the preceding objects which is adapted equally for producing either solid or hollow molded articles and in which in the case of hollow articles the liquid chocolate removed from the center is returned directly to the molding apparatus to be available as a supply for subsequent operations.

It is a further object of this invention to produce a novel chocolate handling apparatus as set forth in the preceding objects which is capable of acting as a tempering apparatus for the molten chocolate without need of having separate tempering or other preparation of the chocolate previous to its supply to the molding apparatus.

It is a further object of this invention to provide a chocolate molding apparatus as set forth in the preceding objects which is suitable with only a minor modification for use as an enrobing machine for covering centers in the production of chocolate filled candies.

It is a still further object of this invention to provide a novel chocolate handling apparatus as set forth in the preceding objects which with only slight modification is suitable for use in depositing and producing small articles of solid chocolate.

Further objects and advantages of this invention will readily become apparent to those skilled in the art upon a more complete understanding of the invention which is shown in the accompanying figures and described in the following detailed description.

In the figures:

FIGURE 1 is a side-elevational view of the preferred embodiment of the invention showing complete apparatus for producing molded chocolate articles including the molding apparatus, a cooling chamber, and a mold preheating chamber;

FIGURE 2 is a top plan view of the apparatus shown in FIGURE 1;

FIGURE 3 is an enlarged perspective view of the chocolate molding apparatus shown in FIGURES 1 and 2;

FIGURE 4 is an enlarged cross-sectional view of the chocolate molding apparatus taken on line 4—4 of FIGURE 3;

Figure 5:
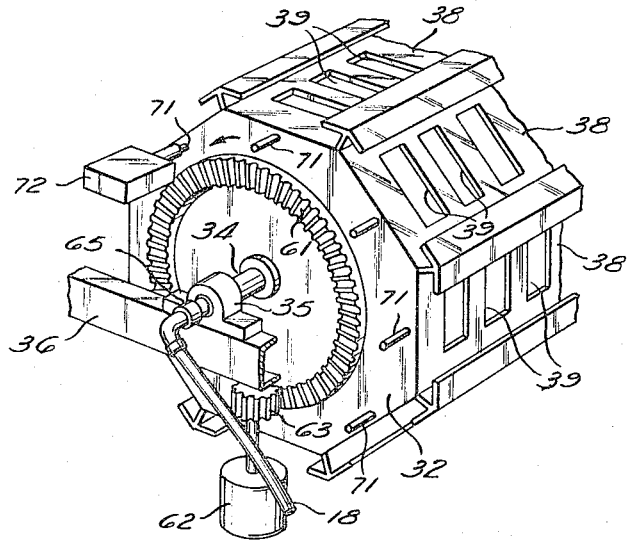
FIGURE 5 is a fragmentary perspective view of the other end of the chocolate molding apparatus shown in FIGURE 3 showing the shutter operating device and the drum indexing and filling apparatus.

Referring now to the figures in greater detail, FIGURES 1 and 2 show in generally schematic form apparatus for producing molded chocolate articles in accordance with the preferred embodiment of this invention. The molding operation is carried out at the molding drum indicated generally at 10 which is supplied with liquid chocolate from a heated liquid chocolate storage tank 12. The chocolate is conducted from the tank 12 by means of a conduit 13 to a suitable tempering machine indicated at 15. From the tempering machine 15 the tempered chocolate is transferred by a pump 17 through a conduit 18 to the molding drum.

The individual molds are assembled together into a mold assembly as indicated at 21. These mold assemblies consist of a large number of individual molds assembled together in a regular array in accordance with the discharge openings on the molding drum as will be described in greater detail hereinafter. In order to prevent premature hardening of the chocolate, the mold assemblies are preheated in a preheat oven indicated at 20 and then conveyed by a suitable power driven conveyor 22 to the molding drum. The filled molds are removed from the underside of the molding drum 10 by means of a removal conveyor indicated generally at 25 and then pass into a cooling chamber 26 maintained at a relatively low temperature by refrigeration apparatus as indicated at 27. After the molds have cooled sufficiently, they are separated to remove the finished articles, after which they are reassembled and returned to the preheat oven 20.

The construction of the molding drum 10 and its related equipment is shown in detail in FIGURES 3, 4 and 5. The molding drum 10 is generally hollow and in the shape of a flat sided drum having a cross-section of a regular polygon. In the embodiment shown, the polygon is shown as being octagonal, but alternatively the polygon may be four, six, or more than eight sides, although as will be understood from further description, the polygon is preferably one having an even number of sides.

The molding drum 10 is mounted for rotation in a structural framework indicated generally at 29. The drum has a pair of end plates indicated at 31 and 32 which are journaled on the frame 29. Preferably, an axle 34 passes through the drum, being secured to the end plates 31 and 32, and the axle 34 is journaled by suitable means such as bearing blocks 35 which may rest on the cross member 36 of the frame 29.

Interconnecting the end plates 31 and 32 are a plurality of side plates 38, one for each side on the end plates, and in the case of the octagonal drum shown in the preferred embodiment of the invention, eight side plates 38 will be used. These side plates are secured, preferably by welding, to the end plates and to each other along the side edges so as to form, together with the end plates, a closed drum adapted to contain liquid chocolate in its interior. Each of the side plates 38 is provided with a plurality of apertures 39 of suitable shape so as to cooperate with the shutter mechanism described hereinafter to allow the chocolate to flow from the interior of the drum and fill the attached molds.

Along each edge at the junction of a pair of adjacent side plates 38, there is provided an outwardly projecting T-shaped bar 41 having flanges 42 extending generally parallel to the adjacent side plates. The flanges 42 are adapted to receive and retain in place on the outside of the side plates 38 one of the mold assemblies 21. These mold assemblies are preferably constructed of a channel shaped plate of lightweight metal as indicated at 44, from the edges of which are upstanding flanges 45 adapted to fit beneath the T-bar flanges 42 so as to hold the mold plates 44 in firm abutting contact with the adjacent side plates. Each of the mold plates 44 is provided with a plurality of apertures 46 adapted to register with the side plate apertures 39. The molds are provided in the form of a plurality of mold blocks 48 having cavities 49 therein which are secured by any siutable means (not shown), such as toggle clamps or the like to the mold plates 44. It will be understood that the mold blocks 48 when assembled to the mold plates 44 form a complete mold assembly having a plurality of cavities therein which are arranged to come into alignment with the apertures 46 and 39 to receive liquid chocolate from the interior of the molding drum 10. After the cavities are filled and the mold assemblies removed, the mold blocks 48 are separated and the cast or molded articles removed from the cavities 49, after which the mold blocks 48 are reassembled with the plates 44 for further reuse.

The flow of liquid chocolate to the individual molds is controlled by means of shutter plates 51. These shutter plates are positioned, one for each side plate 38, on the inside of the drum in abutting relationship with the adjacent side plate. The shutter plates 51 are arranged to slide longitudinally to bring apertures 52 into register with the side plate apertures 39 to allow chocolate to flow into the molds, and to be moved to a closed position in which the apertures 39 and 52 are not in communication with each other so as to prevent any flow of chocolate from the interior of the drum. The shutter plates 51 are slidably journaled by means of T-bars 53 secured on the inside of the drum along the edges of a pair of adjacent side plates 38. The T-bars 53 have flanges 54 to hold the shutter plates 51 in contact with the side plates 38.

To insure proper and complete filling of the molds without bubbles or air cavities being formed, a positive filling device is provided in the form of weight plate 57. There is one weight plate associated with each of the adjacent shutter plates and side plates, and the weight plates 57 are of generally heavy rigid material such as steel plate. The weight plates 57 are mounted slidably on pins 58 secured to the inner faces of the side plates 38 to allow radial movement to and from the shutter plates 51. The weight plates 57 are retained against excessive inward movement by heads 59 formed on the guide pins 58. Thus, when a weight plate is in the upper position as seen in FIGURE 4, it falls to the inner position adjacent the pin heads 59. When the mold moves down to the lower position where the mold cavities are filled, the weight plate 59 falls against the shutter plate 51 to provide a pressure assist to force chocolate into the mold cavities and expel air therefrom.

Rotation of the molding drum 10 is accomplished by means of a suitable step-wise indexing mechanism since it will be understood that for filling each mold assembly the molding drum 10 moves step-wise a portion of a revolution corresponding to the number of sides with the drum stopping so that there is always one side on the bottom. The drum is then held in that position to allow the molds to be filled, after which it is quickly indexed or rotated to the next position. In the case of the 8-sided mold shown in FIGURE 4, the mold drum will then be rotated one-eighth turn for each indexing cycle. The indexing mechanism may be any suitable means and as shown a ring gear 61 is secured on the outer face of the end plate 32 and driven by means of an indexing motor 62 having a pinion 63 in engagement with ring gear 61. The motor 62 can then be rotated intermittently to provide the proper cycle time for the molding operation. Of course, it is understood that other indexing mechanisms such as one way clutches, Geneva mechanisms and the like can be also employed for the indexing operation. As shown in FIGURE 5, the supply of chocolate to the interior of the molding drum 10 may be accomplished by means of the swivel fitting indicated at 65 to allow a chocolate to flow in through a hollow portion of the axle 34 from the conduit 18.

The actuation of the shutter plates 51 may be accomplished in any suitable manner, and in the embodiment shown, the shutter plates 51 are provided with pins as indicated at 69 projecting through the end plate 31. A suitable actuator such as an air cylinder or the like indicated at 70 may then be used to shift the pin 69 inward to move the shutter plate 51 in one of either the open or closed positions. Likewise, another pin 71 at the other end of each shutter plate 51 may project through the end plate 32 for movement by another actuator 72 to shift the shutter plate in the opposite direction.

When the molding drum is in operation, tempered liquid chocolate is maintained at the proper temperature within the drum at the level indicated at 67. In order to maintain the chocolate at the proper temperature, the drum may be provided with internal heaters, and separation of the component materials is prevented by the cyclic rotation of the drum which provides the proper stirring and agitation to maintain a uniform temperature as well as to provide a tempering action on the liquid chocolate.

The mold assemblies supplied by the preheat oven 20 are raised to a temperature only slightly below that of the hardening point or crystallization temperature of the chocolate so that the cooling of the chocolate may be uniform and the interior of the mold cavities will have time to be completely coated and the air bubbles removed before a hardened shell is formed on the surface of the mold cavity. The mold assemblies are transferred by the conveyor 22 which is intermittently driven by an indexing motor 22a and is provided with suitable means such as the pusher plates 23 to force the mold assembly into place on the upper position I. (For purposes of clarity, the positions will be indicated by the Roman numerals I through VIII indicating the sequential positions as shown in FIGURE 4 starting from the top position.) Since there is no force on the mold assembly, its weight and the careful fit between the mold plate flanges 45 and the T-bar flanges 42 may be relied upon to hold the mold assembly in position, or alternatively if desired suitable clamping means may be used, including such means as spring detents or the like to insure that after the mold assembly is placed in position at position I it remains in place on the drum until it is removed. It should be noted that in position I the shutter plate 51 is in the closed position and the weight plate 57 inwardly hanging against the pin heads 59. After the molding drum 10 has indexed one-eighth of a revolution, in position II the actuator 72 is operated to shift the pin 71 inwardly and move the shutter plate 51 to the open position. As the molding drum 10 is indexed to position III, the adjacent side plate now passes below the chocolate level 67 so that the chocolate may now flow through the shutter plate aperture 52, side plate apertures 39 and mold plate aperture 46 into the interior of the cavities 49. After the next indexing, the mold assembly reaches position IV so that the weight plate 57 is allowed to slide downward on the guide pins 58 to provide a positive pressure forcing chocolate to completely fill the cavities 49 and allow any air bubbles therein to be expelled into the interior of the chocolate within the molding drum.

The next indexing brings the mold assembly down to the bottom at position V as shown in FIGURE 4, whereupon the actuator 70 is operated to shift the pin 69 inwardly and move the shutter plate 51 to the closed position, so that chocolate can no longer enter or leave the mold cavities. After this has been done, while the mold assembly remains in position V, the removal conveyor 25 whose construction and operation are similar to that of conveyor 22 is operated to remove the filled mold assembly as shown in FIGURE 3. After this has been done, no further action takes place in positions VI and VII but when the drum is indexed to position VIII, the weight plate 57 then falls away from the adjacent side plate to the inward position, so that when the molding drum 10 is indexed one additional eighth of a revolution back to position I the side plate is ready to receive a new mold.

The foregoing description is intended to apply to molding of solid articles, but the same apparatus may be used for molding hollow articles with only a slight modification in the molding cycle. When it is desired to mold hollow articles, operation of the stages are the same at I, II, III, and IV as described. However, when the mold assembly reaches position No. V at the bottom, the actuator 70 is not operated nor is the conveyor 25 driven to remove the mold. Rather, the mold remains in this position with the shutter plate open and continues to pass to positions VI, VII and VIII. Of course, when the mold assembly reaches VIII the shutter is still open and since the mold assembly is turned upside down, the liquid chocolate remaining in the interior can run back into the interior of the drum 10. However, the liquid chocolate has now been in the mold cavities long enough to allow the portion in contact with the mold surface to harden yielding the desired hollow shell of the finished article. After this is done, the mold assembly is allowed to pass through the subsequent stages and except that another actuator is required to hold the shutter plate 51 in the closed position to prevent further entry of chocolate into the interior when the mold assembly reaches the No. III position, thus, further cooling takes place and when the mold assembly reaches No. V position for the second time it is removed by the removal conveyor 25. Thus, the molding of hollow articles may be accomplished simply by changing the cycle timing and allowing each mold assembly to remain in position on the molding drum for two complete revolutions instead of the single revolution required for solid molded articles.

After the mold assembly has been removed by the removal conveyor 25, it passes into the cooling chamber 26 where the hardening operation is completed, after which the mold blocks 48 are taken apart and the finished articles removed from the cavities 49. After this has been done, the mold assemblies are put back together and transferred into the preheat oven 20 so that the molding cycle may be repeated.

Figure 6:
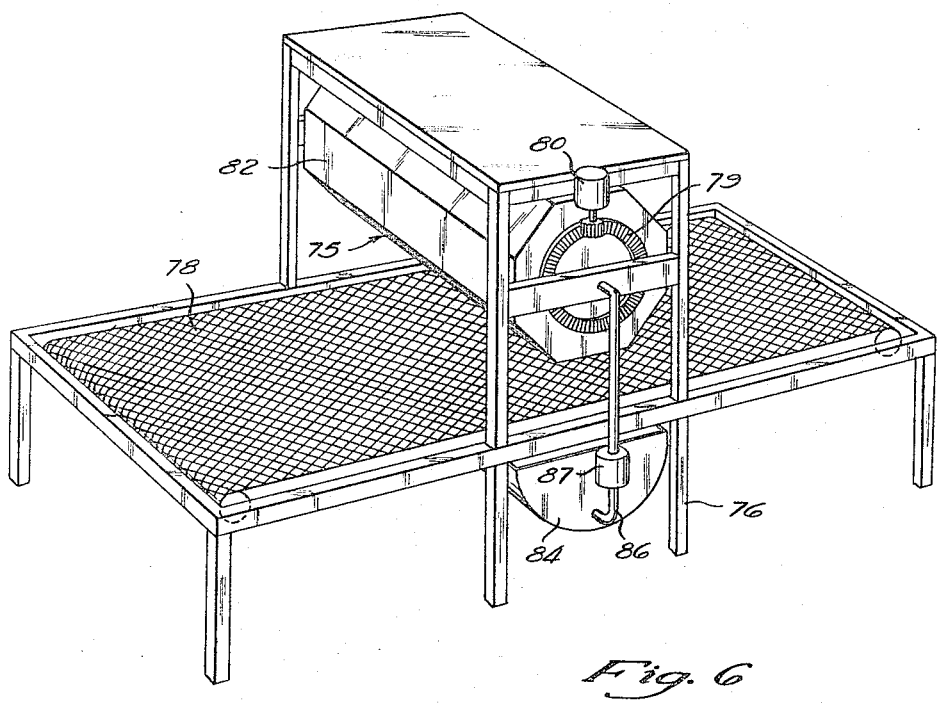
FIGURE 6 is a perspective view of a modification of the apparatus shown in FIGURES 1 through 5 adapted for enrobing or depositing type operations.

The apparatus of the molding drum may be utilized with only slight modification for other processes such as enrobing. The modification for enrobing is shown in FIGURE 6, and as shown therein the drum 75 is mounted for rotation in a suitable framework 76. An endless mesh conveyor belt shown at 78 is provided to carry the centers to be coated underneath the drum 75. Separate apparatus is preferably employed for coating the bottoms of the centers, which is preferably done before the centers reach the drum 75. As shown, the drum is rotated by means of the ring gear 79 and indexing motor 80 rotates the drum 75 in step-wise fashion. The drum 75 is provided with apertured side plates 82 and with shutter plates on the interior having apertures which cooperate with the apertures on the side plates 82 to open and close to allow the flow of chocolate in the same manner as in the embodiment of FIGURES 1 through 5. Of course, in the place of the mold plates a plate having reduced apertures or a slot extending the full length of the drum may be provided to form the proper curtain of liquid chocolate for the enrobing operation.

A suitable catch tank or pan 84 is provided beneath the drum 75 to receive the excess chocolate which runs off the centers through the belt 78. This pan 84 collects this chocolate which may then be transferred by a conduit 86 and pump 87 back up to the interior of the drum 75.

It is contemplated that when the drum is used for enrobing, the indexing will take place at a fairly rapid rate and the shutters open and closed at the proper rate form the curtain of chocolate. It is also contemplated that an alternative method of operation would be to rotate the drum 75 at a continuous slow speed and sequentially open the shutters of the plate at the bottom so as to form a continuous moving curtain of chocolate so that at the one side the side plate is closed as it moves toward the upward portion of the cycle, while the adjacent side plate on the descending portion is opened so that the curtain of chocolate is maintained at all times. In such a case, it would be desirable that the drum 75 rotate so that the bottom portions are moving in the direction opposite to the belt 78 to insure that a portion of the belt and the centers thereon will be continuously coated without any intervening gaps.

The same apparatus as used for enrobing may be easily adapted to depositing operations such as forming solid chocolate drops and the like by applying plates having a plurality of nozzles thereon adapted to deposit the chocolate on a solid belt in the desired shape, in which case when a side plate reaches the bottom the shutter would be open and closed for merely sufficient time to allow enough chocolate to reach the nozzles as to result in the proper amount of chocolate in each bit deposited on the belt.

Although the preferred embodiment and a modified embodiment of the invention have been shown in the drawings and described in the above detailed description, it is recognized that upon complete understanding of the invention, other modifications and rearrangements will occur to those skilled in the art and may be resorted to without departing from the scope of the invention as defined in the claims.

What is claimed is:

1. Apparatus for molding articles comprising a drum rotatable about a longitudinal axis, said drum having a chamber in the interior thereof containing the liquid material to be cast, said drum having a plurality of flat longitudinal side walls, an aperture in each of said longitudinal side walls, a plurality of molds havings a hollow cavity and a filling opening, means to releasably secure said molds to said side walls of said drum with said filling openings in alignment with said apertures, and shutter means within said drum adapted to selectively open and close said drum apertures to allow said liquid material to enter said mold cavity.

2. Apparatus for molding articles comprising a drum rotatable about a longitudinal axis, said drum having a chamber in the interior thereof containing the liquid material to be cast, said drum having a plurality of flat longitudinal side walls, a plurality of apertures in each of said longitudinal side walls, a plurality of molds each having a plurality of hollow mold cavities and filling openings, means to releasably secure said molds to said walls of said drum with said filling openings in alignment with said apertures, and shutter means within said drum adapted to selectively open and close said drum apertures to allow said liquid material to enter said filling openings and hollow mold cavities.

3. Apparatus for the manufacture of molded chocolate articles comprising a drum rotatable about a longitudinal axis, said drum having a chamber in the interior thereof containing the liquid material to be cast, said drum having the cross-sectional shape of a regular polygon defined by a plurality of longitudinally extending flat side plates, each of said side plates having a plurality of apertures therein, a plurality of mold assemblies each comprising a plurality of hollow cavities having adjacent filling openings adapted to register with the apertures in said side plates when said mold assemblies are positioned adjacent said side plates, means to releasably secure said mold assemblies to said side plates, shutter means associated with each of said side plates adapted to selectively open and close said side plate apertures to allow the liquid chocolate within said drum to enter said mold cavities, means to actuate said shutter means between open and closed positions, means to indexably rotate said drum about said longitudinal axis, and means for attaching mold assemblies, filling mold assemblies, and removing mold assemblies at different stations around the periphery of the molding drum.

4. Apparatus for the manufacture of molded chocolate articles comprising a drum rotatable about a longitudinal axis, said drum having a chamber in the interior thereof containing the liquid material to be cast, said drum having the cross-sectional shape of a regular polygon defined by a plurality of longitudinally extending flat side plates, each of said side plates having a plurality of apertures therein, a plurality of mold assemblies each having a plurality of hollow cavities having filling openings adapted to register with the apertures in said side plates when said mold assemblies are positioned adjacent said side plates, means to releasably secure said mold assemblies to said side plates, first handling means adapted to place a mold assembly in molding position adjacent the side plate on said drum at one station of the drum, second handling means adapted to remove filled mold assemblies from said drum at another station of the drum, shutter means associated with each of said side plates adapted to selectively open and close said side plate apertures to allow the liquid chocolate within said drum to enter said mold cavities, means to actuate said shutter means between open and closed positions, and means to indexably rotate said drum about said longitudinal axis whereby the operations of attaching mold assemblies, filling mold assemblies, and removing mold assemblies take place at different stations around the periphery of the molding drum.

5. Apparatus for the manufacture of chocolate articles comprising a drum rotatable about a longitudinal axis, said drum having a chamber in the interior thereof containing the liquid material to be cast, said drum having the cross-sectional shape of a regular polygon defined by a plurality of longitudinally extending flat side plates, each of said side plates having a plurality of apertures therein, shutter means associated with each of said plates adapted to selectively open and close said side plate apertures, means to actuate said shutter means between open and closed positions, and means to indexably rotate said drum about said longitudinal axis.

6. Apparatus for the manufacture of molded chocolate articles comprising a drum rotatable about a longitudinal axis, said drum having a chamber in the interior thereof containing the liquid material to be cast, said drum having the cross-sectional shape of a regular polygon defined by a plurality of longitudinally extending flat side plates, each of said side plates having a plurality of apertures therein, a plurality of mold assemblies each comprising a plurality of hollow cavities having adjacent filling openings adapted to register with the apertures in said side plates when said mold assemblies are positioned adjacent said side plates, means to releasably secure said mold assemblies to said side plates, first handling means adapted to place a mold assembly in molding position adjacent the side plate on said drum on the upper side of said drum, second handling means adapted to remove filled mold assemblies from said drum on the lower side of said drum, shutter means associated with each of said side plates adapted to selectively open and close said side plate apertures to allow the liquid chocolate within said drum to enter said mold cavities, means to actuate said shutter means between open and closed positions, means to apply pressure to assist the flow of chocolate into said mold cavities, and means to indexably rotate said drum about said longitudinal axis whereby the operations of attaching mold assemblies, filling mold assemblies, and removing mold assemblies take place at different stations around the periphery of the molding drum.

7. Apparatus for the manufacture of molded chocolate articles comprising a frame, horizontal axle rotatably journaled on said frame, a hollow drum secured to said axle co-axially therewith, said drum including a pair of axially spaced end plates secured to said axle and a plurality of side plates arranged to form a regular polygon and defining with said end plates a hollow chamber within said drum adapted to contain the liquid chocolate to be molded, each of said side plates having a plurality of apertures therein, a plurality of mold assemblies each having a plurality of hollow cavities having filling openings arranged to register with the apertures in said side plates when said mold assemblies are positioned adjacent said side plates, means to releasably secure said mold assemblies to said side plates, first conveyor means adapted to place a mold assembly in molding position adjacent the side plates on said drum at one station of the drum, second conveyor means adapted to remove filled mold assemblies from said drum at another station of the drum, shutter means associated with each of said side plates adapted to selectively open and close said side plate apertures to allow the liquid chocolate within said drum to enter said mold cavities, means to actuate said shutter means to the open position after the mold assembly has been placed in contact with the adjacent side plates, means to actuate said shutter means to the closed position when the adjacent side plate is adjacent said second conveyor, and means to step-wise indexably rotate said drum about said axle whereby the operations of attaching the mold assemblies, filling mold assemblies, removing mold assemblies take place at different stations around the periphery of the molding drum.

8. Apparatus for the manufacture of molded chocolate articles comprising a frame, a horizontal axle rotatably journaled on said frame, a hollow drum secured to said axle co-axially therewith, said drum including a pair of axially spaced end plates secured to said axle and a plurality of side plates arranged to form a regular polygon and defining with said end plates a hollow chamber within said drum adapted to contain the liquid chocolate to be molded, each of said side plates having a plurality of apertures therein, a plurality of mold assemblies each comprising a plurality of hollow cavities having adjacent filling openings arranged to register with the apertures in said side plates when said mold assemblies are positioned adjacent said side plates, means to releasably secure said mold assemblies to said side plates, first conveyor means adapted to place a mold assembly in molding position adjacent the side plates on the upper side of said drum, second conveyor means adapted to remove filled mold assemblies from the lower side of said drum, shutter means associated with each of said side plates adapted to selectively open and close said side plate apertures to allow the liquid chocolate within said drum to enter said mold cavities, means to actuate said shutter means to the open position after the mold assembly has been placed in contact with the adjacent side plates, means to actuate said shutter means to the closed position when the adjacent side plate is adjacent said second conveyor, a weight plate adjacent each of said side plates within said drum, means mounting said weight plate to allow movement to and from the inner side of said side plate whereby when said side plate is in an upper position said weight falls away from said side plate and when said side plate is in a lower molded position the weight of said weight plate forces it against the inner side of said side plate to force chocolate into the mold assemblies, and means to step-wise indexably rotate said drum about said axle whereby the operations of attaching the mold assemblies, filling mold assemblies, removing mold assemblies take place at different stations around the periphery of the molding drum.

References Cited

UNITED STATES PATENTS

| | | | |
|---|---|---|---|
| 1,840,578 | 12/1932 | Garvey | 107—15 |
| 1,898,175 | 2/1933 | Garvey | 107—15 |
| 2,476,395 | 7/1949 | Williams. | |

WALTER A. SCHEEL, *Primary Examiner.*

JOSEPH SHEA, *Assistant Examiner.*